US008917851B2

(12) United States Patent
Simoes et al.

(10) Patent No.: US 8,917,851 B2
(45) Date of Patent: Dec. 23, 2014

(54) SERVER FOR PROVIDING ENHANCED SERVICES TO CONTACT CENTER AGENTS

(75) Inventors: Renato Pinheiro Simoes, Fortaleza-CE (BR); Roderick Brian Averill, Centennial, CO (US); Pier Angelo Tognini Filho, Goiânia-GO (BR); Brian Scot Hillis, Centennial, CO (US)

(73) Assignee: Avaya Inc., Basking Ridge, NJ (US)

( * ) Notice: Subject to any disclaimer, the term of this patent is extended or adjusted under 35 U.S.C. 154(b) by 1197 days.

(21) Appl. No.: 12/773,064

(22) Filed: May 4, 2010

(65) Prior Publication Data

US 2011/0158397 A1 Jun. 30, 2011

Related U.S. Application Data

(60) Provisional application No. 61/291,684, filed on Dec. 31, 2009.

(51) Int. Cl.
*H04M 3/00* (2006.01)
*H04M 5/00* (2006.01)
*H04M 3/51* (2006.01)

(52) U.S. Cl.
CPC .................................. *H04M 3/5183* (2013.01)
USPC ................. 379/265.01; 379/265.02; 379/258; 379/260; 709/202; 709/227

(58) Field of Classification Search
USPC .......... 379/265.09, 265.01, 265.02, 260, 258; 709/202, 227
See application file for complete search history.

(56) References Cited

U.S. PATENT DOCUMENTS

| 5,309,504 A | * | 5/1994 | Morganstein | ................ 379/67.1 |
| 7,197,133 B2 | * | 3/2007 | Cook et al. | ............... 379/265.09 |
| 2003/0086556 A1 | * | 5/2003 | Welch et al. | ............. 379/265.09 |

* cited by examiner

*Primary Examiner* — Simon King

(57) ABSTRACT

A technique is disclosed that enables a contact center to provide enhanced services to its agents. An agent server is interconnected with the automatic call distributor (ACD) and agent telephones of the contact center. The server intercepts messages sent by the ACD, which contain caller-provided data obtained by an interactive voice response system. When it is determined that the particular agent has access to both a telephone and a personal computer, the agent server draws a distinction in the information content of the received message. In doing so, the agent server provides the call initialization information in the message to the agent's telephone, and appears as if the information were coming from the ACD; additionally, the agent server provides the caller-provided data to the agent's personal computer. The personal computer is then able to execute a predetermined application, such as a display-oriented presentation application, based on the caller-provided data.

14 Claims, 8 Drawing Sheets

Telecommunications System 200

SERVER FOR PROVIDING ENHANCED SERVICES TO CONTACT CENTER AGENTS

CROSS REFERENCE TO RELATED APPLICATIONS

This application claims the benefit of U.S. Provisional Application 61/291,684, filed Dec. 31, 2009, which is also incorporated by reference.

The underlying concepts, but not necessarily the language, of the following cases are incorporated by reference:

(1) U.S. patent application Ser. No. 12/201,565, filed Aug. 29, 2008.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to telecommunications in general, and, more particularly, to providing enhanced services to one or more agents at a contact center.

BACKGROUND OF THE INVENTION

A contact center is a facility where telephone calls are handled by human operators known as agents, usually with some degree of computer automation. Typically, a contact center has the ability to handle a considerable volume of calls, providing functions such as routing calls to agents, logging calls, recording calls, and so forth. Contact centers are used by many mail-order catalog organizations, telemarketing companies, computer product help desks, government agencies, and large enterprises.

FIG. 1 in the prior art depicts telecommunications system 100, which features a complement of equipment that collectively make up a contact center, labeled as contact center 110. Telecommunications system 100 comprises telecommunications endpoint 102, which is used by caller 101 to originate or receive calls; telecommunications network 103 for transporting those calls; interactive voice response system 104; automated call distributor 105; and telecommunications endpoints 107-1 through 107-M, wherein M is a positive integer. Telecommunications endpoints 107-1 through 107-M are used by contact center agents 108-1 through 108-M, respectively. The depicted elements are interconnected as shown.

In a typical scenario in the prior art, caller 101 dials into contact center 110 and interacts with interactive voice response (IVR) system 104. The caller selects an option to talk with an agent (i.e., one of agents 108-1 through 108-M), and if an agent is available the call is automatically routed to the agent. If all agents are busy, however, Automated Call Distributor (ACD) 105 inserts the call into a queue instead, and the caller is placed "on hold." Callers on hold are typically played a message such as the following: "All agents are currently assisting other customers. Please stay on the line and the next available agent will take your call. Calls are answered in the order that they are received."

Telecommunications endpoint 107-1 is typically a special hardphone, in that it is able to communicate agent states to ACD 105. The agent states indicate to the ACD whether agent 108-1, corresponding to endpoint 107-1, is available to handle an incoming call and, if available, how the call is to be delivered to the agent. Typically, the agent signals his state of availability by pressing a button on his hardphone. For example, when the agent becomes available to talk with caller 101, he can signal to ACD 105 that he is available by selecting the "manual-in" button to switch a queued call in manually, or the "auto-in" button to have ACD 105 automatically switch in a queued call. ACD 105 then delivers the call to the endpoint of that agent.

In order to effectively serve the caller's needs, the contact-center agent requires access to newer and newer features. In the prior art, some of these features have been provided by new telecommunications endpoint hardware—for example, with new buttons to indicate selections made by the agent and new displays to present information to the agent. Other features have been provided in the prior art by software upgrades, which require that changes be made to the automatic call distributor or other data-processing systems at the contact center. The upgrade of telephone hardware, of contact center software, or of both can be difficult or impractical, in part because of the cost and effort required to develop and install the software.

Therefore, what is needed is a method to provide enhanced services to contact center agents, without some of the costs and disadvantages in the prior art.

SUMMARY OF THE INVENTION

The present invention enables a contact center to provide enhanced services to its contact center agents, and without some of the costs and disadvantages in the prior art. The illustrative embodiment of the present invention features an agent server allocated to the contact center, as well as a personal computer for each agent. The agent server is a server computer that is interconnected with the automatic call distributor (ACD) and agent telephones of the contact center, and executes the method described herein. In accordance with the illustrative embodiment, the agent server intercepts messages sent by the ACD, which are intended for the agent telephones and which contain caller-provided data obtained by an interactive voice response (IVR) system at the contact center.

When it is determined that the particular agent has not only a telephone for handling the media packets of the call, but also a personal computer available for executing agent client software, the agent server transmits different portions of the information content of the received message to the two endpoints. In doing so, the agent server provides the call initialization information in the message to the agent's conventional telephone, which information is made to appear as if it were coming from the ACD; additionally, the agent server provides at least some of the caller-provided data to the agent's ancillary endpoint, a personal computer. The personal computer is then able to execute a predetermined application, such as a display-oriented presentation application, based on the caller-provided data.

In some embodiments, the agent server is able to receive data from the application executing on the personal computer and processes the data accordingly. As one example, the agent server might receive data related to a post-call survey, in which the agent indicates to the contact center that the caller is to be transferred to an IVR that handles the post-call survey. As another example, the agent server might receive data related to password validation, in which the agent indicates to the contact center to temporarily transfer the caller to an IVR that handles the password validation. This results in improved security in that the agent is prevented from accessing the caller's personal identification number or other sensitive information, which the caller may feel safer about entrusting to a machine rather than a human agent.

In some other embodiments, the agent server is able to provide agent state information to the ACD, on behalf of those agents without proprietary telephones. For all of these enhancements, the overarching advantage is that these enhancements can be provided without having to upgrade either the agent's telephone or the ACD itself.

The illustrative embodiment of the present invention comprises: receiving, at a server computer, a first message comprising i) caller-provided data from a calling endpoint and ii) indicating a call to a first address that corresponds to a first telecommunications endpoint; determining whether the first address is associated in a database with a second address that corresponds to a second telecommunications endpoint; transmitting, based on the determining step, a second message to the second telecommunications endpoint, the second message comprising the caller-provided data; and initializing the first telecommunications endpoint to be the recipient of voice packets that are originated by the calling endpoint during the call.

DETAILED DESCRIPTION

For the purposes of this Specification, including the appended claims, the term "call," and its inflected forms, is defined as an interactive communication involving one or more telecommunications endpoint (e.g., "phone", etc.) users, who are also known as "parties" to the call. A voice call is featured in the illustrative embodiment of the present invention, in which speech signals originated by at least one of the call parties is transmitted to another call party. As those who are skilled in the art will appreciate, in some alternative embodiments, a call may comprise video signals. Furthermore, a call can involve one or more human call parties or one or more automated devices, alone or in combination with each other. In various embodiments of the present invention, a call may be a voice telephony call, a high-fidelity audio call, a video-based call, a text-based instant messaging (IM) session, a Short-Message Service (SMS) transmission, a MultiMedia Service (MMS) transmission, and so forth.

Figure 2:
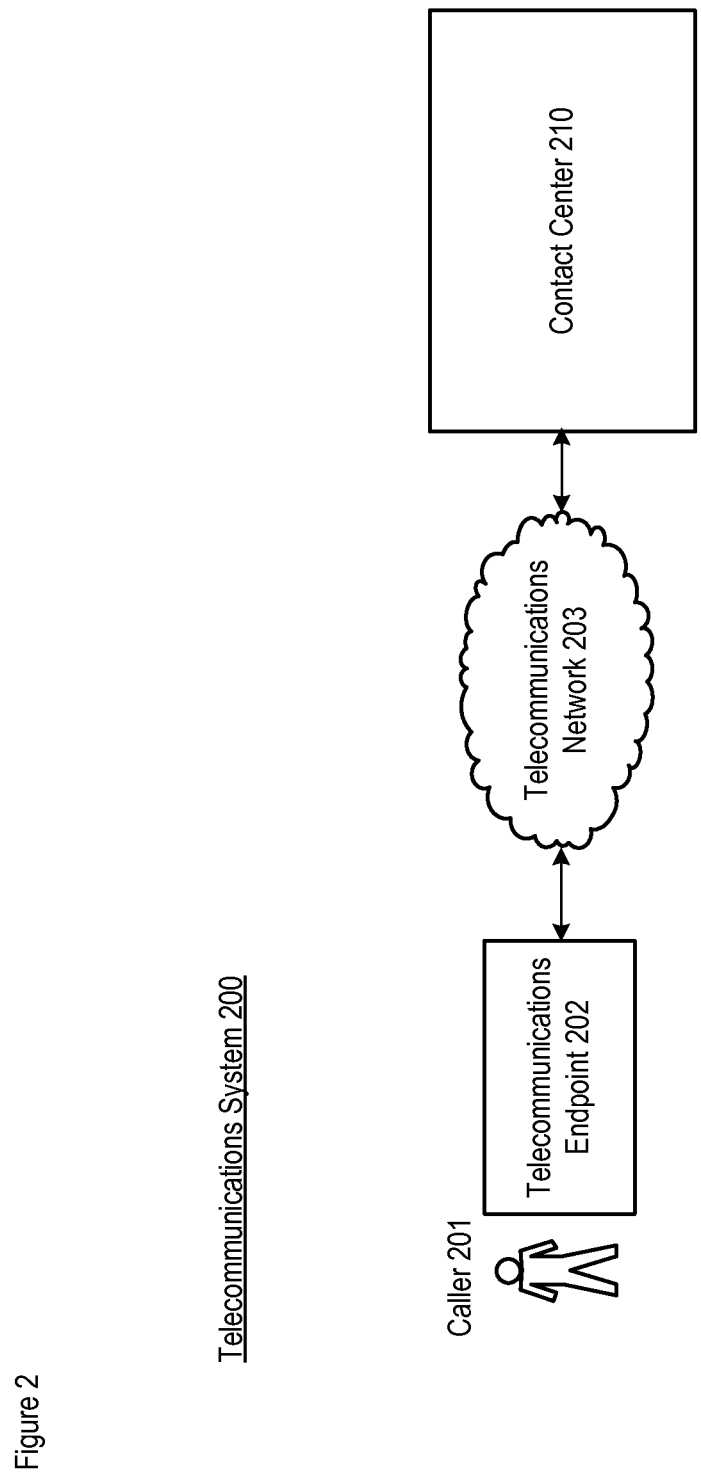
FIG. 2 depicts telecommunications system 200, which features a "contact center" in accordance with the illustrative embodiment of the present invention.

FIG. 2 depicts telecommunications system 200, which features a "contact center" in accordance with the illustrative embodiment of the present invention. Telecommunications system 200 comprises telecommunications endpoint 202, which is used by caller 201, and also comprises telecommunications network 203 and contact center 210. The depicted elements are interconnected as shown.

Although well suited for use with system 200, the present invention is not limited to use with any particular type of communication system or configuration of system elements. Those who are skilled in the art, after reading this specification, will recognize that the disclosed techniques may be used in a variety of computing applications.

Figure 1:
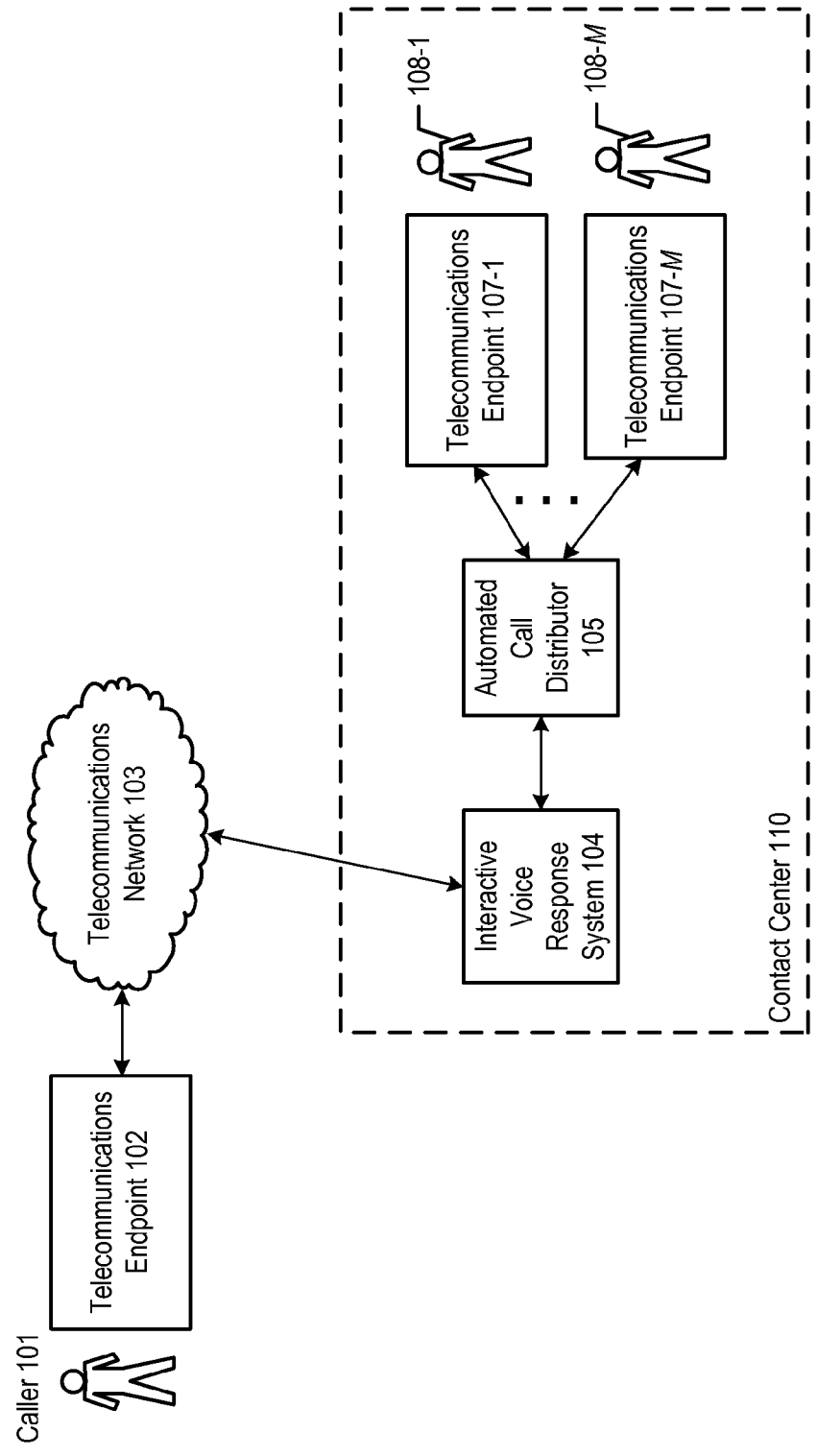
FIG. 1 in the prior art depicts telecommunications system 100, which features a complement of equipment that collectively make up a contact center.

Telecommunications endpoint 202 is a device similar to endpoint 102 of FIG. 1, in that it is capable of originating or receiving calls, or both. For example and without limitation, endpoint 202 can be one of a telephone, a notebook computer, a personal digital assistant (PDA), and so forth.

Endpoint 202 handles calls via telecommunications network 203 and is capable of exchanging voice and call processing-related signals with one or more other devices, such as the telecommunications endpoints that are part of contact center 210. To this end, endpoint 202 exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with network 203, as well as with contact center 210.

Telecommunications network 203 is similar to network 103 of FIG. 1, in that it is a network such as the Public Switched Telephone Network [PSTN], the Internet, etc. that carries calls to and from telecommunications endpoint 202, contact center 210, and other devices not shown in FIG. 2.

Contact center 210, which is sometimes referred to as a "call center," provides the functionality of a private-branch exchange with an automatic call distributor (ACD). In particular, contact center 210 receives incoming calls from telecommunications network 203 that are made by representative endpoint 202, as well as by other endpoints that are not depicted. Contact center 210 directs each received call to one of a plurality of telecommunications endpoints within the enterprise, or to another function such as interactive voice response (IVR), depending on how contact center 210 is programmed or configured. For example, in an enterprise contact center, center 210 may comprise logic for routing calls to contact agents' endpoints based on criteria such as how busy various contact agents have been in a recent time interval, the telephone number called, and so forth. Contact center 210 is further described below and with respect to FIG. 3.

In handling incoming calls, contact center 210 is capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with calling endpoints such as endpoint 202. As those who are skilled in the art will appreciate, after reading this specification, contact center 210 is capable of communicating by using other protocols, in some alternative embodiments.

Figure 3:
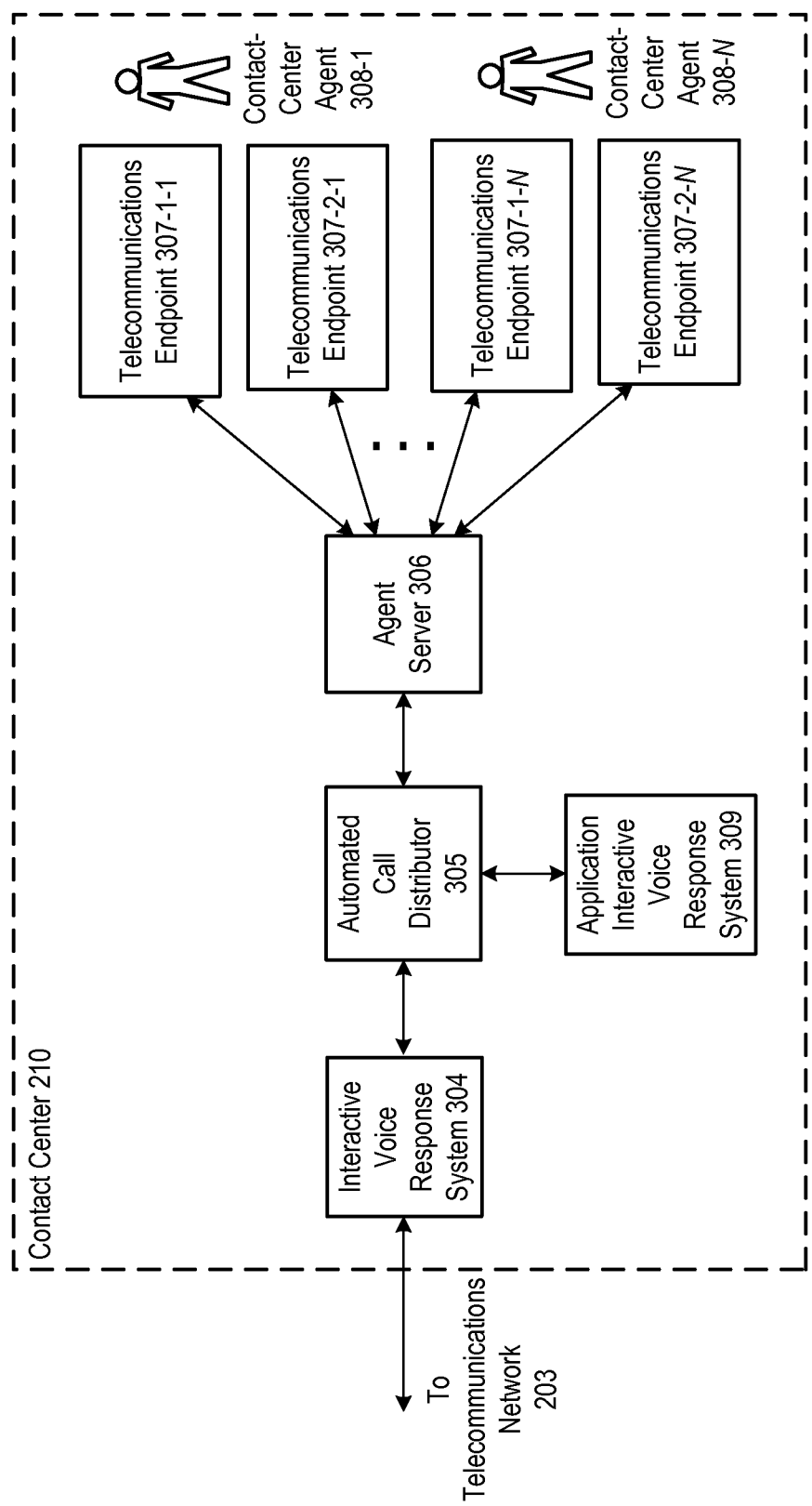
FIG. 3 depicts contact center 210 of system 200, in accordance with the illustrative embodiment of the present invention.

FIG. 3 depicts contact center 210, in accordance with the illustrative embodiment of the present invention. Contact center 210 comprises interactive voice response systems 304 and 309; automated call distributor 305; agent server 306; telecommunications endpoints 307-1-1 through 307-1-N, wherein N is a positive integer; and telecommunications endpoints 307-2-1 through 307-2-N. The depicted elements are interconnected as shown.

Interactive Voice Response (IVR) system 304 is a data-processing system that provides IVR-related functionality. In doing so, IVR system 304 enables a caller, such as caller 201, to provide information to contact center 210, in well-known fashion, for example by uttering responses to audio prompts provided by IVR system 304. IVR system 304 then makes available the caller-provided data to one or more other systems, such as automated call distributor 305. IVR system 304 may provide the caller-provided data in the form of the options selected by the caller, the prompts played to the caller, and so forth. In any event, it will be clear to those skilled in the art how to make and use IVR system 304.

IVR system 309 is a data-processing system similar to IVR system 304, but which provides IVR-related functionality in support of the applications described below and with respect to FIGS. 6 and 7.

Automated call distributor (ACD) 305 is a data-processing system that provides automated call distribution functionality. In doing so, ACD 305 queues calls in well-known fashion, based on the callers having indicated to IVR system 304 their need to talk to a contact agent. It will be clear to those skilled in the art how to make and use ACD 305.

Agent server 306 is a data-processing system that provides at least some of the features of the illustrative embodiment of the present invention. In accordance with the illustrative embodiment, agent server 305 is a server computer; however, it will be clear to those skilled in the art, after reading this specification, how to make and use alternative embodiments in which agent server 305 is another type of data-processing system. Server 306 provides the ability to handle the call-control signaling being exchanged between ACD 305 and the multiple endpoints that serve each of contact agents 308-1 through 308-N, in accordance with the illustrative embodiment. The salient components of agent server 306 that enable such communication between ACD 305 and both endpoints 307-1-n and 307-2-n for a given agent 308-n, for n=1 to N, are described below and with respect to FIG. 4. Agent server 306 also performs the tasks of the illustrative embodiment, the salient tasks of which are described below and with respect to FIG. 5.

Telecommunications endpoint 307-1-n, where n has a value between 1 and N, is a device that is capable of originating or receiving calls, or both. Endpoint 307-1-n enables its user, agent 308-n, to converse or otherwise communicate during a call with a caller such as caller 201. Specifically, once a call session is initialized (i.e., "set up"), endpoint 307-1-n exchanges media signals, such as voice packets or other types of media packets, with other endpoints such as endpoint 202. Endpoint 307-1-n exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with other devices throughout telecommunications system 200. In order to transmit data to endpoint 307-1-n, the endpoint is provisioned with an address that is unique within the address space of contact center 210. For pedagogical purposes, this address is referred to as the "agent phone" address, and endpoint 307-1-n is referred to as a "conventional" endpoint.

In accordance with the illustrative embodiment, endpoint 307-1-n is a telephone set with Internet Protocol capability. In some alternative embodiments, as those who are skilled in the art will appreciate, endpoint 307-1-n can be a hardphone, a personal computer executing a softphone, or any other type of device that is capable of being initialized to exchange media signals with another endpoint within telecommunications system 200. Furthermore, those who are skilled in the art will appreciate, endpoints 307-1-1 through 307-1-N can be different from one another. In any event, it will be clear to those skilled in the art how to make and use telecommunications endpoint 307-1-n.

Telecommunications endpoint 307-2-n, where n has a value between 1 and N, is a device that is capable of transmitting or receiving information related to a call, or both; in doing so, endpoint 307-2-n provides at least some of the features of the illustrative embodiment to its user, agent 308-n. Endpoint 307-2-n is capable of exchanging call-related information with ACD 305. In order to transmit data to endpoint 307-2-n, the endpoint is provisioned with an address that is unique within the address space of contact center 210. For pedagogical purposes, this address is referred to as the "agent client" address, and endpoint 307-2-n is referred to as an "ancillary" endpoint with respect to endpoint 307-1-n.

The call-related information that is handled in the illustrative embodiment includes caller-provided information acquired by using IVR system 304 and state-related information exchanged with ACD 305. It will be clear however to those skilled in the art, after reading this specification, how to make and use alternative embodiments in which other types of call-related information are handled.

In accordance with the illustrative embodiment, endpoint 307-2-n is a personal computer. In some alternative embodiments, as those who are skilled in the art will appreciate after reading this specification, endpoint 307-2-n can be another type of device that is capable of presenting call-related information to agent 308-n. Furthermore, endpoints 307-2-1 through 307-2-N may be different from one another, while some endpoints 307-n may not be present at all for some values of n, while for some other values of n there may be multiple additional endpoints. For example, endpoint 307-2-1 (i.e., n equals 1) may be present and associated with endpoint 307-1-1 that serves agent 308-1, no additional endpoint may be present or associated with endpoint 307-1-2 (i.e., n equals 2) that serves agent 308-2, and two additional endpoints (i.e., endpoints 307-2-3 and 307-3-3) may be present and associated with endpoint 307-1-3 (i.e., n equals 3) that serves agent 308-3, and so forth. In any event, it will be clear to those skilled in the art, after reading this specification, how to make and use alternative embodiments that feature some or all of these possible variations.

Each pair of telecommunications endpoints 307-1-n and 307-2-n is made up of physically distinct devices, such as a telephone set and a personal computer, in accordance with the illustrative embodiment. In some alternative embodiments of the present invention, what are being referred to as "endpoints" can actually be provided by a first software process (i.e., providing "endpoint" 307-1-n) and a second software process (i.e., providing "endpoint" 307-2-n) executing with the same data-processing system, such as a personal computer, as those who are skilled in the art will appreciate after reading this specification.

Some alternative embodiments of the present invention may feature an architecture for contact center 210 that is different from that of the illustrative embodiment. For example, in some embodiments, the functionality of some or all of IVR system 304, ACD 305, and agent server 306 may be provided in a single data-processing system or through a different number and configuration of data-processing systems than depicted in FIG. 3. It will be clear to those skilled in the art, after reading this specification, how to make and use such alternative architectures.

In accordance with the illustrative embodiment, contact center 210 features agent server 306 as a server computer that serves to extend the functionality of ACD 305. This type of extension of functionality may be needed, for example, when the data-processing system represented by ACD 305 is difficult or impractical to modify. In order to provide the features of the illustrative embodiment, agent server 306 is made transparent to both ACD 305 and telecommunications endpoint 307-1-n, for n=1 to N. This transparency is achieved by using a technique referred to as a "service wrap." The service wrap technique features a double-registration mechanism that serves to keep agent server 306 in the signaling path between ACD 305 and endpoint 307-1-n. This is achieved essentially by making ACD 305 "think" that it is communicating with endpoint 307-1-n when it is actually communicating with agent server 306, and by making endpoint 307-1-n "think" that it is communicating with ACD 305 when it is actually communicating with agent server 306. The "service wrap" is further described in co-pending application U.S. patent application Ser. No. 12/201,565, filed Aug. 29, 2008 and already incorporated herein by reference. It will be clear however to those skilled in the art, after reading this specification, how to make and use alternative embodiments in which agent server 306 is interposed and maintained in the signaling path between ACD 305 and endpoint 307-1-n through other means.

Figure 4:
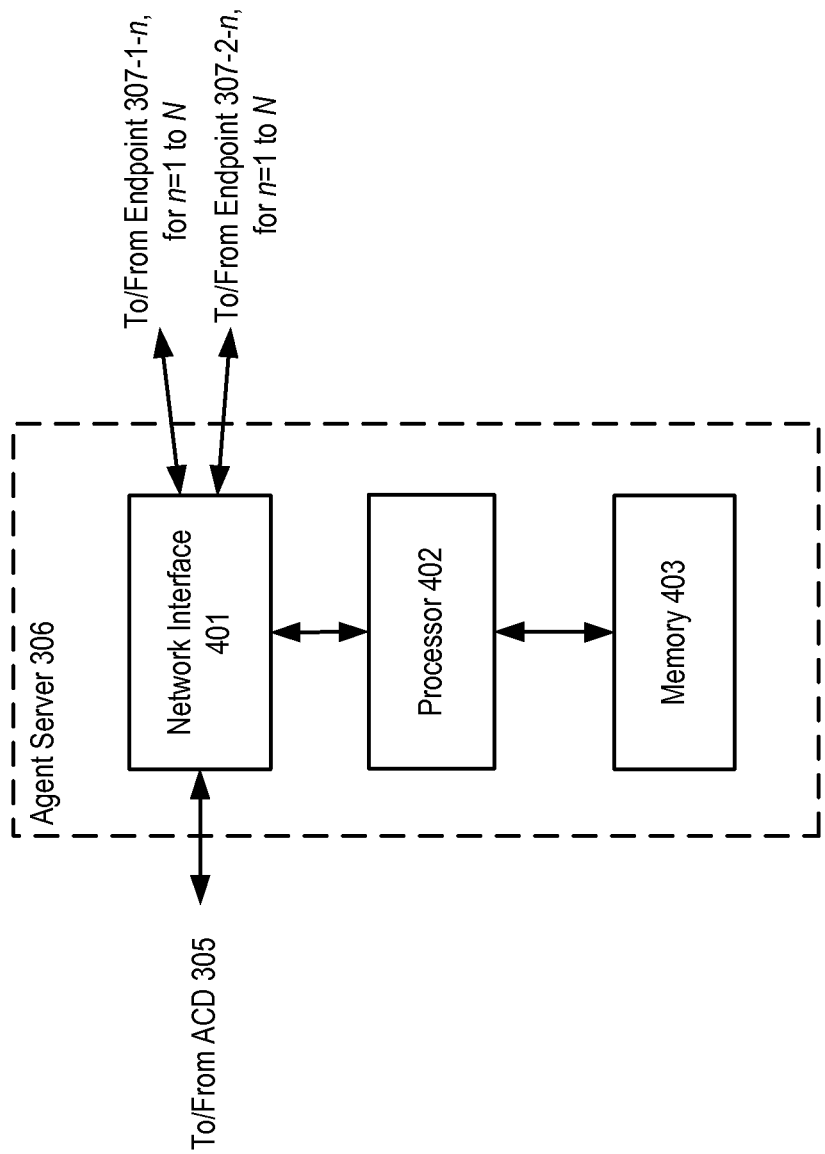
FIG. 4 depicts the salient components of agent server 306, which is part of contact center 210.

FIG. 4 depicts the salient components of agent server 306, in accordance with the illustrative embodiment of the present invention. Agent server 306 comprises network interface 401, processor 402, and memory 403, interconnected as shown. It will be clear to those skilled in the art, after reading this disclosure, how to make and use alternative embodiments of the present invention in which agent server 306 comprises any subcombination of the components listed above.

Network interface 401 comprises the hardware and software that enables agent server 306 to receive signals from and transmit signals to ACD 305 and agent endpoints 307-1-n and 307-2-n, for n=1 to N, in well-known fashion.

Processor 402 is a general-purpose processor that is capable of receiving information from and transmitting information to network interface 401, of executing instructions stored in memory 403 including those that correspond to the tasks of the illustrative embodiment, and of reading data from and writing data into memory 403. For example and without limitation, processor 402 can be a microprocessor, a microcontroller, a digital signal processor, and so forth. In some alternative embodiments of the present invention, processor 402 can be a special-purpose processor.

Memory 403 stores the instructions and data used by processor 402, in well-known fashion. In particular, memory 403 comprises a non-transitory computer-readable medium for storing processor executable instructions that are operable, when executed, to perform the tasks of the illustrative embodiment. For example and without limitation, memory 403 can be any combination of dynamic random-access memory (RAM), flash memory, disk drive memory, and so forth.

Figure 5:
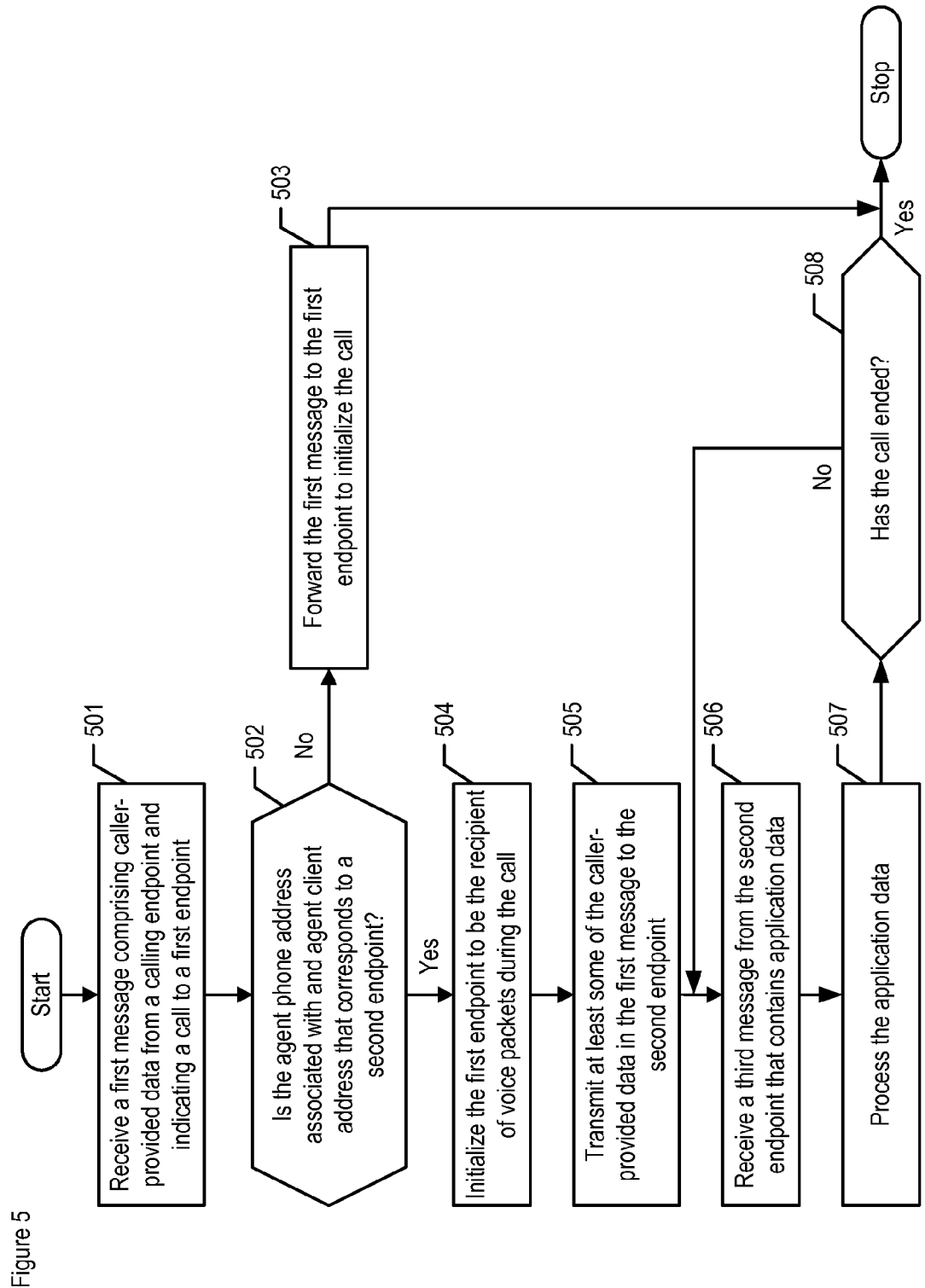
FIG. 5 depicts a flowchart of the salient tasks performed by agent server 306 of contact center 210.

FIG. 5 depicts a flowchart of the salient tasks performed by agent server 306, in accordance with the illustrative embodiment of the present invention. As those who are skilled in the art will appreciate, some or all of the tasks described herein can be performed simultaneously or in a different order than that depicted. Furthermore, each task described herein is individually and separately claimable.

In accordance with the illustrative embodiment, agent server 306 performs the depicted tasks, which are described below. However, it will be clear to those skilled in the art, after reading this specification, how to make and use alternative embodiments of the present invention, in which a data-processing system other than agent server 306 performs some or all of the described tasks, such as automatic call distributor 305.

For illustrative purposes, the text that follows will refer to messages related to the Session Initiation Protocol (SIP). However, it will be clear to those skilled in the art, after reading this specification, how to make and use alternative embodiments of the present invention in which a signaling protocol other than SIP is used.

At task 501, agent server 306 receives and intercepts a SIP INVITE message from ACD 305 comprising caller-provided data and call-transfer signaling. As already described in the service wrap discussion earlier, ACD 305 "thinks" that it is transmitting the SIP INVITE message to conventional endpoint 307-1-n. This is reflected in the INVITE message from ACD 305 in that the message indicates, as the destination address (i.e., in the "To" header), the agent phone address that corresponds to endpoint 307-1-n. As already described, the caller-provided data was collected by IVR 304 during its interaction with caller 201, inserted by IVR 304 in custom SIP headers, and propagated by IVR 304 to ACD 305 in well-known fashion, along with the call-transfer signaling.

At task 502, agent server 306 determines whether the specified agent phone address is associated in a database with an agent client address that corresponds to ancillary endpoint 307-2-n. The database is used to map, for each contact center agent, the agent client address of ancillary endpoint 307-2-n to the agent phone address of conventional endpoint 307-1-n. The database can be resident at server 306 or can be resident at a different data-processing system, as those who are skilled in the art will appreciate.

If the agent phone address is not associated with an agent client address, only a conventional endpoint (i.e., a hardphone) exists for the particular agent handling the call, and task execution proceeds to task 503. However, if the agent phone address is, in fact, associated with an agent client address, then an ancillary endpoint is identified as being existent for the conventional endpoint, and task execution proceeds to task 504.

At task 503, agent server 306 forwards to endpoint 307-1-n the SIP INVITE message received at task 501. When it receives the SIP INVITE message, conventional endpoint 307-1-n interacts with ACD 305, through server 306, to initialize a session that corresponds to the incoming call in well-known fashion. Task execution then ends for this scenario, and the call is subsequently handled as in the prior art.

For the case in which both a conventional and ancillary endpoint exist, at task 504 agent server 306 transmits to endpoint 307-1-n a SIP INVITE message, which has the effect of initializing in well-known fashion a session that corresponds to the incoming call, including preparing endpoint 307-1-n to exchange media (e.g., voice, etc.) packets with calling endpoint 202. So that the SIP INVITE will appear to endpoint 307-1-n to be coming from ACD 305, server 306 provides the address of ACD 305 as the origination address in the message (i.e., in the "From" header). In accordance with the illustrative embodiment, server 306 refrains from transmitting any of the caller-provided data to conventional endpoint 307-1-n, which data are to be transmitted to the ancillary endpoint as described below. In some alternative embodiments, however, server 306 may transmit at least some of the caller-provided data to endpoint 307-1-n, as those who are skilled in the art will appreciate.

At task 505, in accordance with the illustrative embodiment, agent server 306 extracts the custom SIP headers that contain the caller-provided data received at task 501. Server 306 then transmits at least some of the caller-provided data extracted to ancillary endpoint 307-2-n, which was identified at task 502. Server 306 transmits the data by using one or more SIP INFO messages and specifies the agent client address of endpoint 307-2-n retrieved at task 502 as the destination address. Server 306 then receives a corresponding OK message from endpoint 307-2-n.

In some embodiments, the transmitting of the caller-provided data to ancillary endpoint 307-2-n has the effect of invoking one or more predetermined applications at the endpoint, in which at least one of the applications is designed to provide a screen popup for displaying at least a portion of the caller-provided data either as-is or reformatted. For example, upon receiving the message that contains the data, the endpoint can launch a web browser and invoke a pop-up application in order to render the caller-provided data in a suitable format, through the web browser.

At task 506, agent server 306 receives a message from ancillary endpoint 307-2-n that contains data that originate from the predetermined application invoked at the endpoint, in response to receiving the message transmitted at task 505. For example, endpoint 307-2-n can transmit the message in response to agent 308-n making a selection through an application executing on endpoint 307-2-n while on an established voice call on endpoint 307-1-n. The type of message transmitted by endpoint 307-2-n to server 306 can be a SIP INFO message, in which case server 306 returns a SIP OK message.

At task 507, agent server 306 processes the message received at task 506. Examples of the type of processing that can be performed are described below and with respect to FIGS. 6 and 7.

At task 508, agent server 306 determines whether the call has ended. If the call has not ended, task execution proceeds back to task 506, in order to receive and process additional application message sequences initiated by endpoint 307-2-n.

Figure 6:
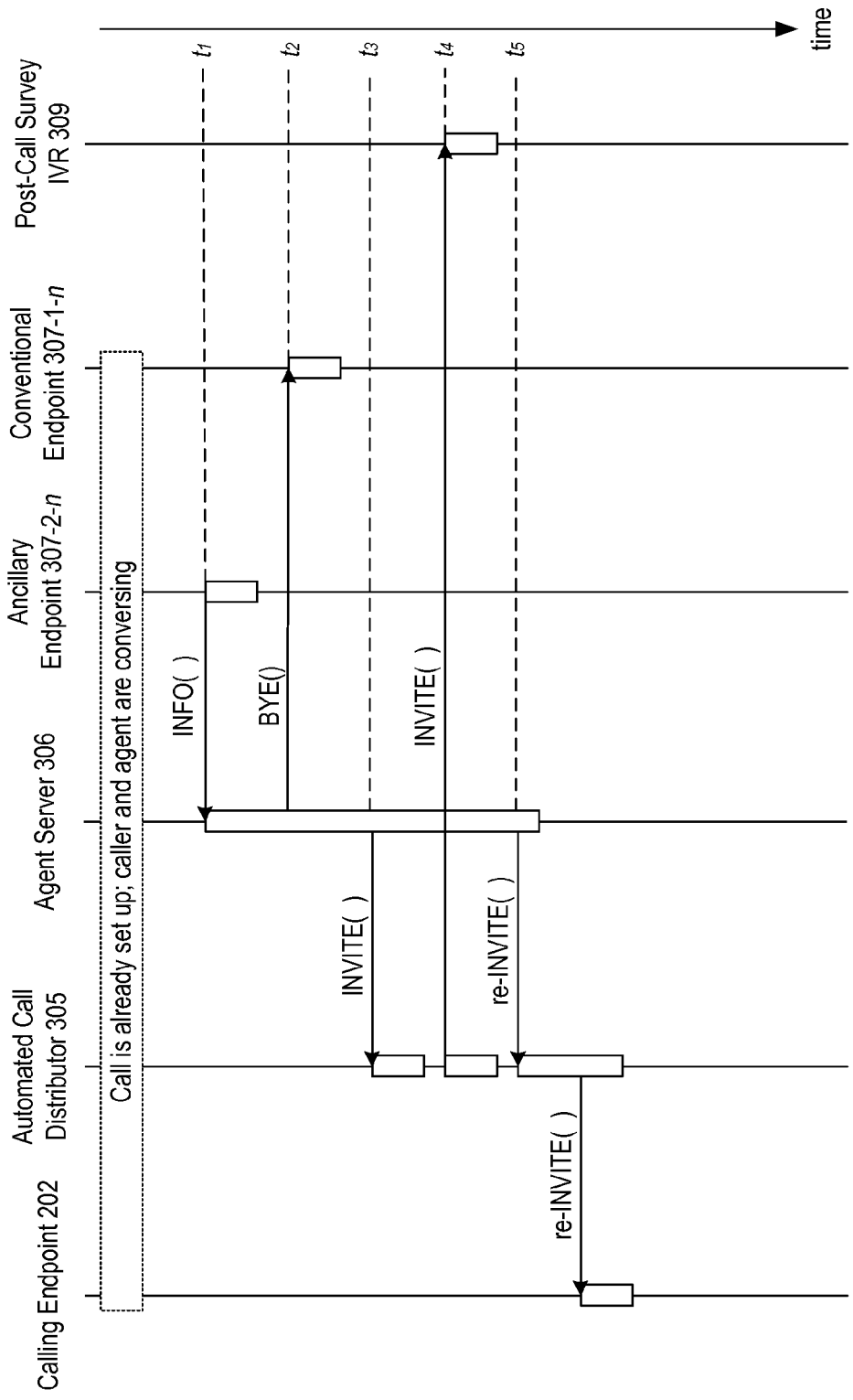
FIG. 6 depicts an example of a post-call survey application provided by contact center 210.

FIG. 6 depicts the processing related to a first example of an application. The data contained in the message received at task 506 originate from a "post-call survey" application executing at ancillary endpoint 307-2-n. In the example, a call is already set up between calling endpoint 202 and conventional endpoint 307-1-n, and caller 201 and agent 308-n are conversing. At the end of the call, the agent asks the caller if she wants to participate in a post-call survey. Assuming that the caller has accepted, the agent selects a "call survey" button on his graphical user interface (GUI) that is part of a screen popup application, such as the one referred to earlier and executing on ancillary endpoint 307-2-n.

With regard to the messaging involved, the selection of the "call survey" option triggers ancillary endpoint 307-2-n to transmit an indication, as represented by the message at time $t_1$, to agent server 306 that the caller is to be transferred to a call-survey interactive voice response (IVR) system. In response, agent server 306 then terminates the session with conventional endpoint 307-1-n by transmitting the BYE message at time $t_2$ and also commands ACD 305 to transfer the caller to Post-Call Survey IVR 309 at time $t_3$. In turn, ACD 305 initializes IVR 309 by transmitting the INVITE at time $t_4$. Meanwhile, agent server 306 transfers the caller to IVR 309, through the re-INVITE sequence beginning at time $t_5$ and traversing ACD 305.

Figure 7:
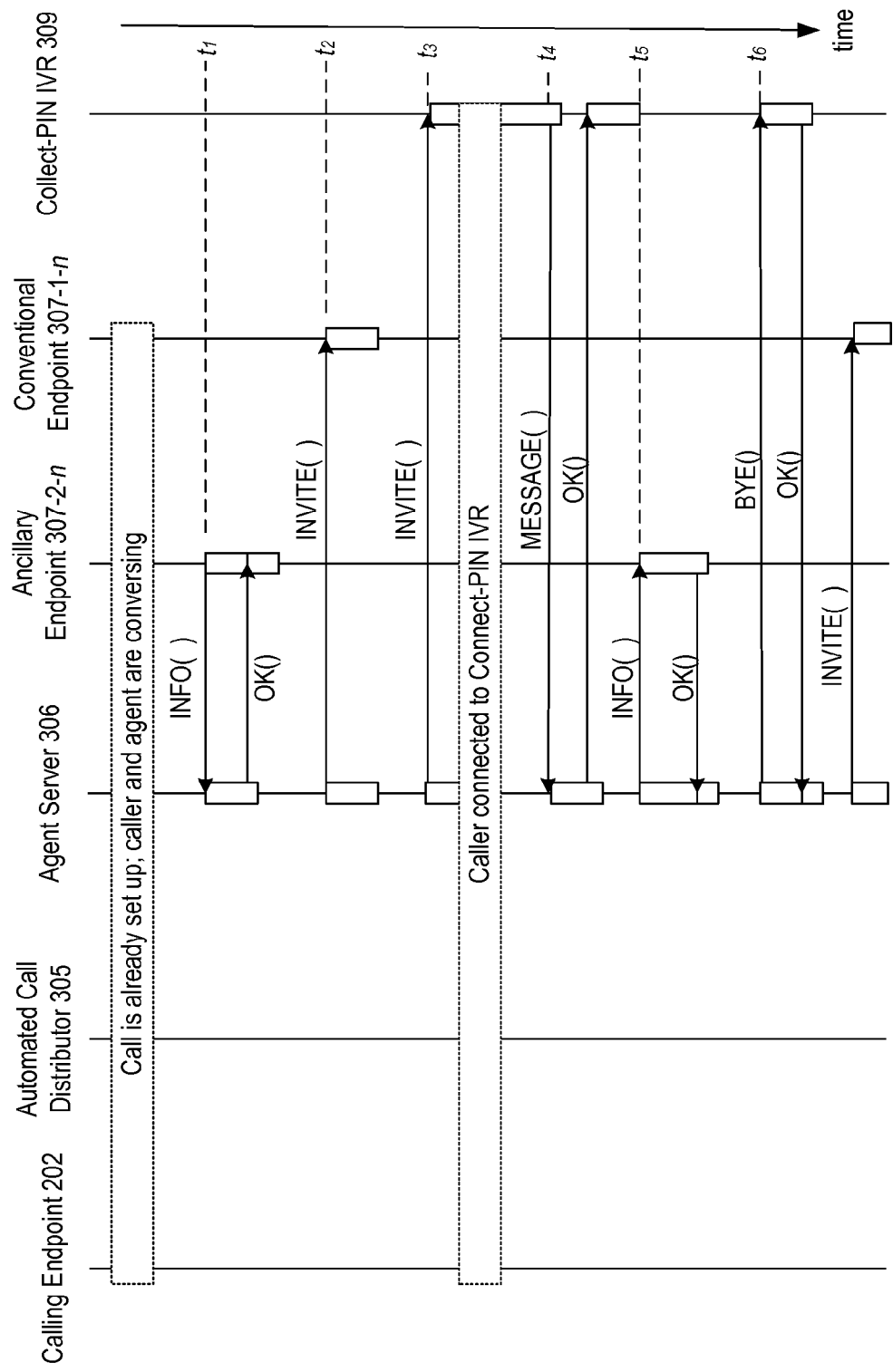
FIG. 7 depicts an example of a password validation application provided by contact center 210.

FIG. 7 depicts the processing related to a second example of an application. The data contained in the message received at task 506 originate from a "password validation" application executing at ancillary endpoint 307-2-n. In the example, a call is already set up between calling endpoint 202 and conventional endpoint 307-1-n, and caller 201 and agent 308-n are conversing. At some point in the conversation, the agent finds it necessary to validate the caller's identity. The agent informs the caller that she will be placed into an IVR system (i.e., Collect-PIN IVR 309) in order to enter her personal identification number (PIN), and that once this occurs she will be transferred back to the agent. The agent then selects a "password validation" button on his graphical user interface (GUI) that is part of a screen popup application, such as the one referred to earlier and executing on ancillary endpoint 307-2-n.

With regard to the messaging involved, the selection of the "password validation" option has the effect of providing an indication to agent server 306 to place the agent on hold, in the INFO-OK sequence beginning at time $t_1$. Agent server 306 places the agent on hold, by transmitting the INVITE at time $t_2$. Agent server 306 then connects Collect-PIN IVR 309 to the caller by transmitting the INVITE at time $t_3$. Once the caller provides her PIN, IVR 309 reports back to agent server 306 whether the validation was successful or failed, in the MESSAGE-OK sequence beginning at time $t_4$. Agent server 306 propagates the validation result (i.e., success or failure) to ancillary endpoint 307-2-n, in the INFO-OK sequence beginning at time $t_5$. After the password validation process is completed, agent server 306 then terminates the session with IVR 309, in the BYE-OK sequence beginning at time $t_6$, and transfers the caller back to the agent to continue with their conversation by transmitting the subsequent INVITE.

The preceding examples of add-on applications are only two such examples and are not intended to imply any limitations in the disclosed technique, in terms of the number and variety of applications that can be implemented, or how these applications can be implemented. It will be clear to those skilled in the art, after reading this specification, how to make and use embodiments of the present invention to enable additional add-on applications that are different than those described.

Figure 8:
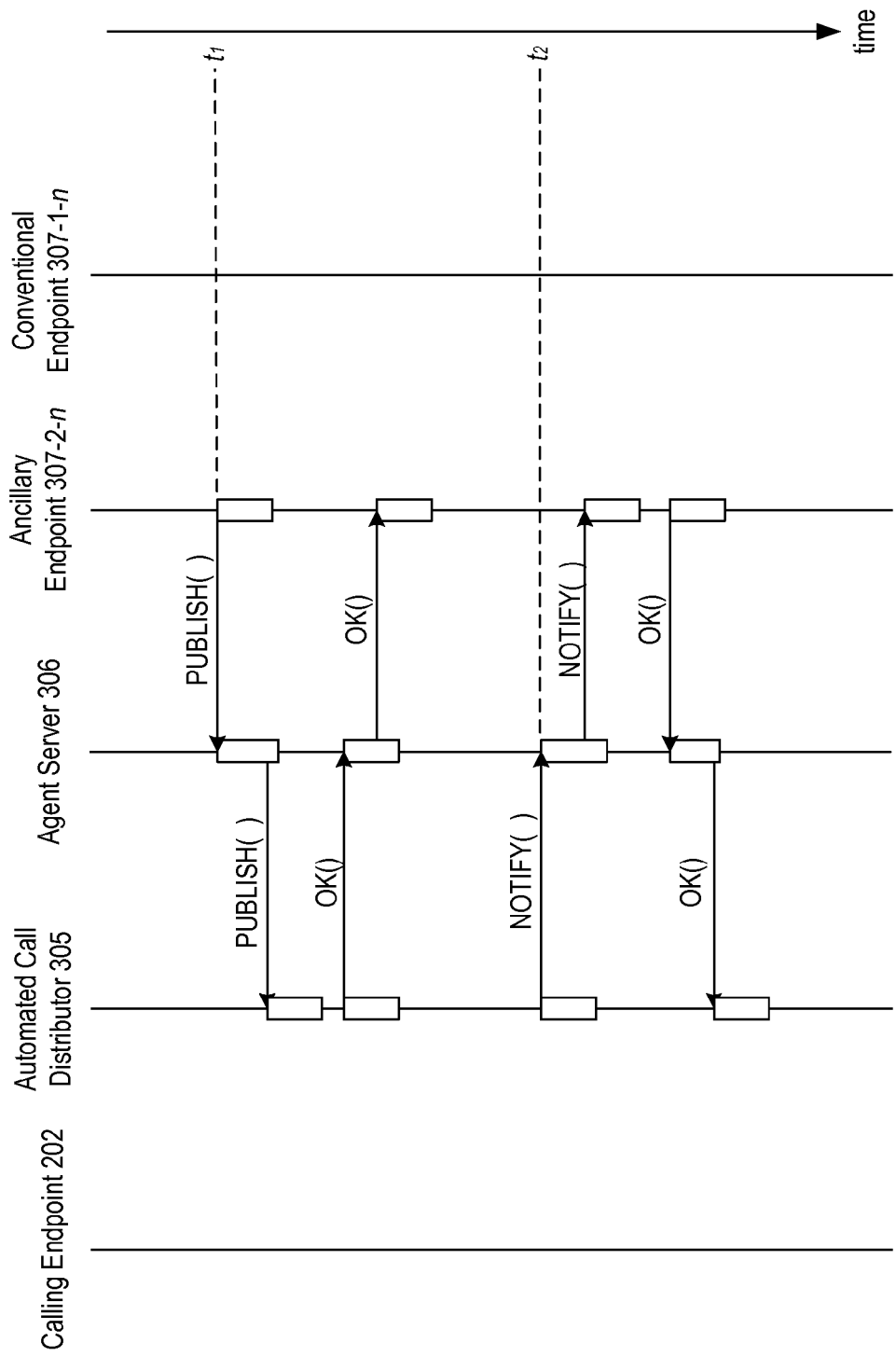
FIG. 8 depicts agent-state control facilitated by server 306.

The tasks and messaging that are described above feature the support of one or more add-on applications. As those who are skilled in the art will appreciate, however, the techniques disclosed herein are not limited to the support of add-on applications. For example, agent server 306 is well suited for supporting agent-state control of automatic call distributor 305, where in the prior art a proprietary hardphone had to be used by the agent to signal his availability with respect to handling incoming calls. As depicted in FIG. 8, in order to emulate this agent-state signaling capability in the illustrative embodiment, agent server 306 is able to receive from ancillary endpoint 307-2-n a SIP PUBLISH message that comprises an indication of an agent state (e.g., unavailable, available for the next call, available until otherwise indicated, etc.). After determining that the agent client address received in the message is associated with the agent phone address of agent 308-n, server 306 forwards the agent state to the address of ACD 305, specifying the agent phone address as the originator. The preceding steps are depicted in FIG. 8 as the PUBLISH-PUBLISH sequence beginning at time $t_1$. In response, server 306 can expect to receive a SIP NOTIFY message from ACD 305, which has the effect of acknowledging the state change, in which the agent phone address is the destination address. Server 306 intercepts the message and forwards the state change information to ancillary endpoint 307-2-n, in order to update the displayed agent state information. The preceding steps are depicted in FIG. 8 as the NOTIFY-NOTIFY sequence beginning at time $t_2$. Eventually, when the agent state is such that agent 308-n is available to handle a call, server 306 receives from ACD 305 a message to initialize conventional endpoint 307-1-n to receive the call.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware is used to implement the systems in accordance with various embodiments of the present invention is dependent on various considerations, such as the speed or efficiency requirements of the system, the particular function, and the particular software or hardware systems being utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, at a server computer, a first message comprising i) caller-provided data from a calling endpoint and ii) indicating a call to a first address that corresponds to a first telecommunications endpoint;
determining whether the first address is associated in a database with a second address that corresponds to a second telecommunications endpoint;
transmitting, based on the determining step, a second message to the second telecommunications endpoint, the second message comprising the caller-provided data;
initializing the first telecommunications endpoint to be the recipient of voice packets that are originated by the calling endpoint during the call;
receiving, from the second telecommunications endpoint, a third message after the transmitting of the second message; and
transferring the calling endpoint to an interactive voice response system, based on the receiving of the third message.

2. The method of claim 1 wherein the first and second telecommunications endpoints are physically distinct.

3. The method of claim 2 wherein the first telecommunications endpoint is a telephone set and the second telecommunications endpoint is a personal computer.

4. The method of claim 1 wherein the second telecommunications endpoint receives no voice packets originated by the calling endpoint during the call.

5. The method of claim 1 wherein the first telecommunications endpoint is provided by a first software process and the second telecommunications endpoint is provided by a second software process, wherein the first software process and the second software process are executed by a personal computer.

6. The method of claim 1 wherein the second message is formatted to invoke a predetermined application at the second telecommunications endpoint, wherein the predetermined application is designed to provide a screen popup for displaying at least a portion of the caller-provided data.

7. The method of claim 1 wherein the first address is associated in the database with the second address, based on both the first address and the second address being provisioned to a same user.

8. The method of claim 1 wherein the caller-provided data are obtained through an interactive voice response system.

9. A method comprising:
receiving, at a server computer, a first message indicating a call to a first address that corresponds to a first telecommunications endpoint;
determining whether the first address is associated in a database with a second address that corresponds to a second telecommunications endpoint;
transmitting, based on the determining step, a second message to the second telecommunications endpoint, the second message being formatted to invoke a predetermined application at the second telecommunications endpoint;
receiving, from the second telecommunications endpoint, a third message comprising data that originate from the predetermined application; and
transferring a calling endpoint of the call to an interactive voice response system at a third address, in response to receiving the third message.

10. The method of claim 9 wherein the first and second telecommunications endpoints are physically distinct.

11. The method of claim 10 wherein the first telecommunications endpoint is a telephone set and the second telecommunications endpoint is a personal computer.

12. The method of claim 9 further comprising initializing the first telecommunications endpoint to be the recipient of voice packets that are originated by the calling endpoint of the call, wherein the second telecommunications endpoint receives no voice packets originated by the calling endpoint during the call.

13. The method of claim 9 wherein the first message provides the third address.

14. The method of claim 9 wherein the data that originate from the predetermined application comprises the third address.

* * * * *